United States Patent Office 3,359,246
Patented Dec. 19, 1967

3,359,246
PROCESS FOR MAKING POLY(MALEIC ANHYDRIDE)
Jim S. Berry, Springfield, Ohio, assignor to The Procter & Gamble Company, Cincinnati, Ohio, a corporation of Ohio
No Drawing. Filed Jan. 28, 1965, Ser. No. 428,838
5 Claims. (Cl. 260—78.4)

This invention relates to the polymerization of maleic anhydride. More specifically, the invention relates to a process for the homopolymerization of maleic anhydride to form poly(maleic anhydride) wherein an essentially quantitative yield of the polymer is obtained. Quantitative yield is used herein to denote essentially a complete conversion of reactant to final product. For example, 95% or more conversion of reactant to product is considered to be an essentially quantitative yield whereas 94% or less conversion of reactant to product is not herein considered to be an essentially quantitative yield.

The copolymerization of maleic anhydride with an abundant variety of other monomers is well known in the art. Many products and corresponding processes have been described regarding the copolymerization of maleic anhydride. Nevertheless, the literature is replete with widely accepted statements that maleic anhydride will not form self-addition compounds or homopolymerize with itself. Indeed, until very recently, poly(maleic anhydride) or any derivatives thereof were totally unknown in the polymer art. Recently, a limited number of workers have reported the homopolymerization of maleic anhydride. However, these prior art attempts to create poly(maleic anhydride) are characterized by: low yields; the use of initiators which leave the polymer product impure in regard to color, odor, etc; the use of solvents which render separation of the polymer difficult; or the use of drastic external stimulation such as nuclear radiation.

Poly(maleic anhydride) or derivatives thereof, though only recently known, are useful for a number of important purposes. For example, poly(maleic acid) and especially the water-soluble salts thereof are excellent show special utility as chemical intermediates, as additives to other polymer systems, as textile chemicals, and are very useful for the surface treatment of metals.

Accordingly, it is an object of this invention to provide a process for the essentially quantitative conversion of maleic anhydride to poly(maleic anhydride).

It is another object of this invention to provide a process for the essentially quantitative homopolymerization of maleic anhydride wherein the polymer obtained is substantially pure.

It is a further object of this invention to provide a process for the essentially quantitative homopolymerization of maleic anhydride, said process being preferably free from the use of solvents and radiation.

These and other objects are realized by the process of homopolymerizing maleic anhydride comprising the use of acetyl peroxide as an initiator.

Surprisingly, when a melt of maleic anhydride is homopolymerized in the presence of acetyl peroxide, an essentially quantitative yield of poly(maleic anhydride) is obtained and further, the polymer produced is substantially free from impurities.

More specifically, this invention involves the process of polymerizing maleic anhydride to form a homopolymer thereof having a molecular weight greater than about 300 comprising the steps of adding to a melt of said maleic anhydride from about 0.5% to about 8% by weight of the maleic anhydride of acetyl peroxide, maintaining the temperature from about 55° C. to about 150° C. and preferably recovering the polymer from the reaction mixture.

Especially desirable results are obtained in the above process when either or both of the following conditions are met: the acetyl peroxide is present in an amount of from about 2% to about 6% by weight of the maleic anhydride; the temperature is maintained from about 70° C. to about 130° C. Outstanding results are obtained when about 5% of the acetyl peroxide is used. The polymer obtained from the process of this invention is substantially free from non-removable impurities, both colormetric and odoriferous. It is difficult to measure precisely the molecular weight of polymers of the type herein produced and different values can be obtained depending on the method of analysis used. Cryoscopic measurements indicate the molecular weight of poly (maleic anhydride) to be in the range of about 300 to 1000. Light scattering results indicate a molecular weight ranging possibly up to 50,000. However, the most accurate method for determining the molecular weight of maleic anhydride homopolymers consist of untracentrifugal measurements. Untracentrifugal results indicate a poly(maleic anhydride) molecular weight of from about 3,500 to about 7,000, the most probable molecular weight being 5,200±1,000. Gel filtration studies on Sephadex columns generally confirm the above-mentioned $$5,200 \pm 1,000$$

molecular weight result.

The process of this invention involves the reacting of a melt of maleic anhydride in the presence of acetyl peroxide. Although homopolymerization could be effected in the presence of a solvent, inert or otherwise, the essentially quantitative yield and the substantially pure product obtained by the process of this invention are particularly easy to obtain when a melt of maleic anhydride, free from solvents, is polymerized by the herein described methods.

In carrying out the process of this invention, various methods may be used without losing the advantages obtainable by the invention. It is, of course, essential that a proper concentration of acetyl peroxide be mixed with maleic anhydride and at the proper temperature range. If these conditions are met, then other factors such as reaction equipment, etc. are not critical. A well-suited method for carrying out the process for a small batch, for example, less than 50 grams, is as follows: the maleic anhydride is melted (melting point is approximately 53° C.) and poured into a dried reaction vessel; the vessel, fitted with a thermometer immersed in the molten maleic anhydride, can be heated by an oil bath or other suitable means until the desired reaction temperature is reached at which time the proper amount of acetyl peroxide is added. It should be recognized that in situ generation of acetyl peroxide by a suitable reaction followed by introduction of the maleic anhydride would be a satisfactory way of starting the reaction. The heating bath should be stirred and the temperature thereof can be maintained at the chosen level by means of a thermal regulator. Using this method, it is usually observed that during the course of the polymerization, the reaction mixture becomes red in color and continues darkening to a reddish brown; the liquid becomes progressively more viscous, and at the termination of the reaction the polymer is a foamed, friable, solid at essentially quantitative conversion.

For larger batches, for example, 50 grams or more, the following method is well-suited for utilizing the process of this invention: Maleic anhydride is crushed into small enough pieces to fit into a flask; the desired amount of acetyl peroxide is added and the flask is fitted with a thermometer and a mechanical stirrer; the flask is then heated to the desired temperature in a water bath and maintained at this temperature throughout the polymerization. The color and viscosity characteristics are similar to those observed in a smaller scale reaction as discussed above. In the use of larger amounts of reactant, mechanical stirring is helpful for improved heat exchange since the polymerization reaction is exothermic. In fact, the heat-transfer media used, whether it be an oil bath, water bath, or otherwise, should be capable of cooling as well as heating because it often becomes necessary, after polymerization is taking place, to cool the reacting mixture in order that the proper temperature be maintained.

Irrespective of which precise method is followed in effectuating the polymerization reaction, the poly(maleic anhydride) is obtained as a reddish-brown, extremely viscous material. The polymer matrix is quite friable at high conversions and can be easily removed from the reaction vessel by simple mechanical means. The conversion of monomer to polymer is essentially quantitative primarily because of the novel use of acetyl peroxide in the process of this invention. Nevertheless, small amounts (up to about 5%) of maleic anhydride monomer and volatile products resulting from initiator decomposition can be present in the polymer product and are preferably removed. Various methods are effective for removing these minor impurities from the polyanhydride product. For example, it is convenient to thin the polyanhydride with a suitable solvent such as tetrahydrofurane or 1,2-dimethoxyethane and to pour the polymer solution slowly into an excess of toluene. The toluene should be rapidly stirred with a stirrer having high shearing force, such as a Waring Blendor, during the addition. The polymer is sheared into fine particles which permits the extraction of most of the solvent and monomer. The polymer can then be easily filtered and dried. The remaining extremely minor amounts of monomer or other impurities can be removed by heating at from 100° C. to about 125° C. in a vacuum oven to constant weight and this is an effective means of such purification. It is frequently preferable, especially if a continuous process is desired, to remove monomer by sublimation in a high vacuum. This leads to complete recovery of unreacted monomer and leaves the polyanhydride in good form. The polyanhydride obtained by the above methods is substantially lighter in color appearance than the reaction mixture previously described.

The polyanhydride obtained by the process of this invention can be easily converted to poly(maleic acid) by dissolving the anhydride polymer in water.

Metallic salts of the above described poly(maleic acid) can be produced by numerous acid-salt conversion reactions which are well known in the art. A particularly desirable method is as follows: Dissolving poly(maleic anhydride) in water and heating at from 90° C. to about 100° C. for a period of time of approximately 0.5 hour; neutralizing the aqueous poly(maleic acid) thus obtained with an alkali solution, for example, NaOH, up to a pH of 10.0; heating on a steam bath for a period of time ranging from about 3 to about 4 hours; and readjusting the pH to about 10.0. The solid alkali metal (e.g. sodium) polymaleate may be recovered from the above solution by any of several methods such as evaporation, freeze-drying, filtration, coacervation, or precipitation. This latter method can be effectuated, for example, by pouring a concentrated aqueous solution of the polymer into rapidly sheared ethanol; the partially dried polymaleate salt thus obtained can be further dried in a vacuum oven.

The poly(maleic anhydride) produced by the process of this invention is quite soluble in non-reactive solvents such as 1,2-dimethoxyethane, acetone, or tetrahydrofurane; it is also quite soluble in water. As described above, the polyanhydride can readily be converted to poly(maleic acid) and the acid form is also quite soluble in a wide variety of solvents. Poly(maleic acid) can be easily converted into its salts or esters. Especially useful compounds are the water-soluble salts of polymaleate such as sodium, potassium, ammonium, lithium, cesium, or tetramethyl ammonium. These salts, or other compounds including esters, can be prepared as described or by any other method known in the art.

Any of the above named or other compounds which are based upon poly(maleic anhydride) can be advantageously produced from a polymer made in accordance with the process of this invention. This is because the herein disclosed process, which requires as the essential feature thereof the homopolymerization of maleic anhydride in the presence of acetyl peroxide, results in an essentially quantitative yield of polymer. In addition, the polymer produced by the process of this invention is substantially free from objectionable impurities. Such impurities, which are found in poly(maleic anhydrides) produced by homopolymerizing the monomer using initiators other than acetyl peroxide, give undesirable odor and color problems which are extremely difficult to overcome.

The process of this invention, as described in detail herein above, can be adapted to either the "batch" or "continuous" forms. In fact, one of the especially advantageous characteristics of the process of this invention is that it lends itself quite expediently to a continuous flow process.

The following example is illustrative of certain specific embodiments of the invention, but the invention is not limited thereto.

EXAMPLE I

To 50 grams of molten maleic anhydride was added 10 milliliters of a commercially available acetyl peroxide solution (2.5 grams of acetyl peroxide were contained in the 10 ml.). The mixture was heated with mechanical stirring in a bath maintained at 75° C. An exothermic reaction, giving internal temperatures up to 85° C., was apparent. Heat was removed from the sample on occasions so as to avoid an internal temperature exceeding 85° C. during the early stages of the polymerization. In the course of two hours the mixture became quite viscous and after three hours was impractical to stir further. The external bath temperature was raised to 100° C., the reaction became more notably exothermic, and the internal temperature rose to 110° C. Copious evolution of carbon dioxide occurred throughout the polymer, and the internal temperature rose without further external heating to a final temperature of 135° C. The product at this stage was a brown, friable mass which was easily removed from the reaction flask.

The polymer was dissolved in 200 ml. of 1,2-dimethoxyethane and reprecipitated by pouring slowly into one liter of toluene rapidly stirred in a Waring Blendor. After addition was complete, the mixture was stirred five minutes before filtering the insoluble polyanhydride. Following a second slurrying in toluene, the product was air-dried and placed in a vacuum-oven at 110° C. for 60 hours. Yield of polyanhydride was 48.9 grams (98% conversion). This polymer was substantially pure, it had no undesirable odor, and was free from any dark coloration. Ultracentrifugal molecular weight determinations were made on polymers corresponding to that prepared in this example and these data indicated a molecular weight of from about 3,500 to about 7,000.

Having thus described the invention, what I claim is:

1. The process of homopolymerizing maleic anhydride which comprises the use of acetyl peroxide as an initiator.

2. The process of polymerizing maleic anhydride to form a homopolymer thereof having a molecular weight greater than about 300 comprising the steps of adding to a melt of the maleic anhydride from about 0.5% to about 8% based on the weight of the maleic anhydride of acetyl peroxide, maintaining the temperature from about 55° C. to about 150° C., and recovering the polymer from the reaction mixture.

3. The process of claim 2 wherein the amount of acetyl peroxide added is from about 2% to about 6% based on the weight of maleic anhydride.

4. The process of claim 2 wherein the amount of acetyl peroxide added is about 5% based on the weight of maleic anhydride.

5. The process of claim 2 wherein the temperature is maintained from about 70° C. to about 135° C.

No references cited.

JOSEPH L. SCHOFER, *Primary Examiner.*

J. KIGHT III, *Assistant Examiner.*